United States Patent
Zhou et al.

(10) Patent No.: US 8,540,359 B2
(45) Date of Patent: Sep. 24, 2013

(54) ELECTRONIC INKS

(75) Inventors: Zhang-Lin Zhou, Palo Alto, CA (US); Jeffrey Todd Mabeck, Corvallis, OR (US); Richard H. Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/386,329

(22) PCT Filed: Oct. 16, 2009

(86) PCT No.: PCT/US2009/060971
§ 371 (c)(1),
(2), (4) Date: Jan. 20, 2012

(87) PCT Pub. No.: WO2011/046562
PCT Pub. Date: Apr. 21, 2011

(65) Prior Publication Data
US 2012/0241695 A1    Sep. 27, 2012

(51) Int. Cl.
*C09D 11/00*  (2006.01)
(52) U.S. Cl.
USPC ........................ 347/100; 106/31.13
(58) Field of Classification Search
USPC ........................ 347/100; 106/31.13
See application file for complete search history.

(56) References Cited

U.S. PATENT DOCUMENTS

| | | | |
|---|---|---|---|
| 5,431,722 A * | 7/1995 | Yamashita et al. | 106/31.43 |
| 6,290,764 B1 * | 9/2001 | Shibata | 106/31.57 |
| 6,376,147 B1 * | 4/2002 | Bonsignore et al. | 430/114 |
| 7,443,570 B2 | 10/2008 | Chopra et al. | |
| 2004/0265722 A1 * | 12/2004 | Qian et al. | 430/114 |
| 2005/0069805 A1 | 3/2005 | Qian et al. | |
| 2006/0003246 A1 | 1/2006 | Moudry et al. | |
| 2006/0025499 A1 * | 2/2006 | Van Brocklin et al. | 523/200 |
| 2008/0033102 A1 * | 2/2008 | Huber et al. | 524/555 |

FOREIGN PATENT DOCUMENTS

EP    1327915    12/2008

OTHER PUBLICATIONS

International Search Report and Written Opinion for PCT/US2009/060971 dated Jul. 20, 2010 (11 pages).

* cited by examiner

*Primary Examiner* — Laura Martin

(57) ABSTRACT

Electronic inks are disclosed herein. The electronic ink includes a non-polar carrier fluid, a plurality of positively charged colorant particles dispersed in the non-polar carrier fluid, and a plurality of reverse co-micelles including a basic charge director and an acidic charge controlling agent. The basic charge director has a molecular weight that is within 5000 of a molecular weight of the acidic charge controlling agent.

20 Claims, 4 Drawing Sheets

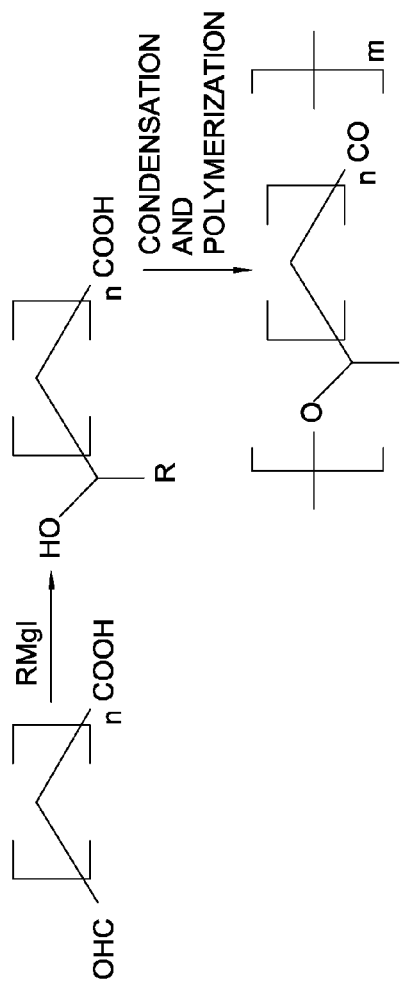
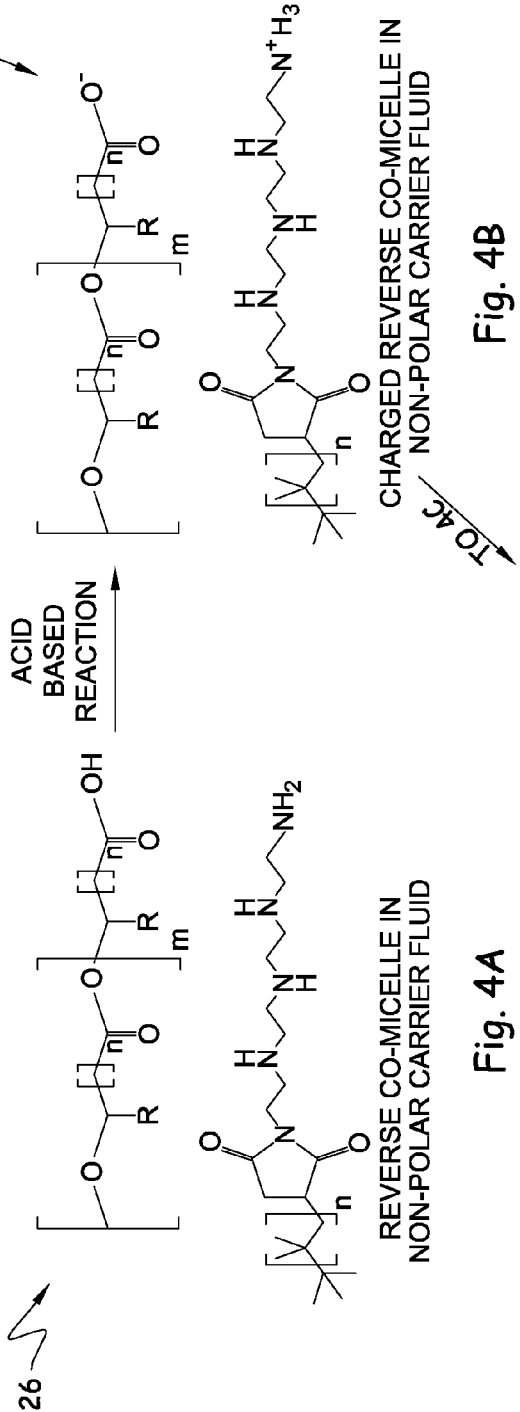
Fig. 3
Fig. 4A
Fig. 4B

ELECTRONIC INKS

BACKGROUND

The present disclosure relates generally to electronic inks.

Electronic inks are commonly used in electronic displays. Such electronic inks often include charged colorant particles that, in response to an applied electric field, rearrange within a viewing area of the display to produce desired images.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 depicts a synthetic methodology for forming sterically hindered polymeric charge controlling agents for use in embodiments of the electronic ink;

FIGS. 4A through 4C together depict an example of a potential reaction mechanism for forming positively charged reverse micelles of a basic charge director and negatively charged reverse co-micelles for use in an embodiment of the electronic ink;

DETAILED DESCRIPTION

Embodiments of the electronic ink disclosed herein are stable due, at least in part, to a non-polar carrier fluid including both positively charged colorant particles and one or more reverse co-micelles and/or reverse micelles carrying an opposite charge. It is believed that the formation of and charging of the various components of the electronic inks disclosed herein are improved when both a basic charge director and an acidic charge controlling agent having substantially matched molecular weights are used during formation of the ink. By "substantially matched molecular weights", it is meant that the molecular weight of the basic charge director is within 5000 of the molecular weight of the acidic charge controlling agent. In some embodiments, it may be more desirable that the molecular weights be within 1000 of each other, and in still other embodiments, it may be more desirable that the molecular weights be within 500 of each other. In some instances, it may also be desirable that the chain length of the acidic charge controlling agent be the same as, or similar to, the chain length of the basic charge director. The chain length of the acidic charge controlling agent is considered to be similar to the chain length of the basic charge director when the number of $CH_2$ repeating units of one chain is within 300 of the number of $CH_2$ repeating units of the other chain. In some embodiments, it may be more desirable that the chain length be within 100 of each other, and in still other embodiments, it may be more desirable that the chain length be within 30 of each other.

The inks disclosed herein are suitable for use in a variety of applications, including display applications, electronic skins, blanket jetting applications, digital printing applications, ion beam printing applications, or other printing applications. Furthermore, the inks disclosed herein have relatively high zeta potentials (i.e., greater than or equal to +20 mV), and thus are particularly suitable for electronic display applications (such as, for example, electro-optical displays). Such electro-optical displays include those that are driven by electrophoresis and/or electro-convective flow. Such inks can also be used in displays with in-plane shutter architectures, where the colorant particles are moved laterally into and out of a field of view in a pixel or sub-pixel display cell. Embodiments of the electronic inks are particularly suitable for this type of display, which tends to produce brighter and more colorful images than other displays.

Figure 1:
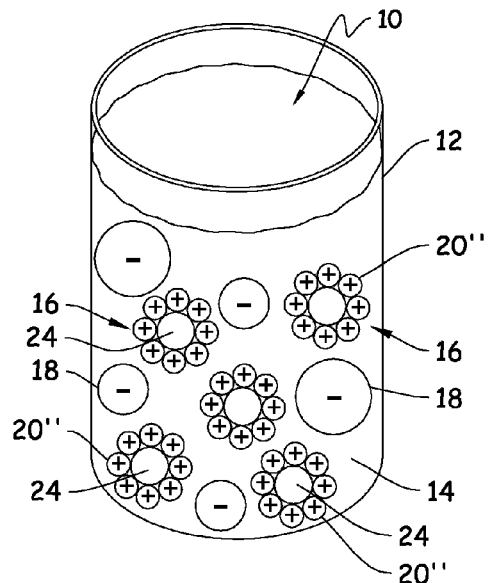
FIG. 1 is a schematic diagram of an embodiment of an electronic ink.

Referring now to FIG. 1, an embodiment of the electronic ink 10 is shown schematically in a container 12. The ink 10 includes a non-polar carrier fluid 14, a plurality of positively charged colorant particles 16, and a plurality of reverse co-micelles 18. While not shown, in some embodiments, the ink also includes a plurality of reverse micelles (e.g., micelles of the basic charge director and/or micelles of the acidic charge controlling agent). Components other than the positively charged particles 16 carry the negative counter charge, thereby resulting in a stable ink 10. In one embodiment (as shown in FIG. 1), the co-micelles 18 carry the negative charges. In another embodiment, one or more of the reverse micelles carry the negative charge. In still another embodiment, at least some of the co-micelles 18 and at least some of the reverse micelles carry the negative charges.

Figure 2:
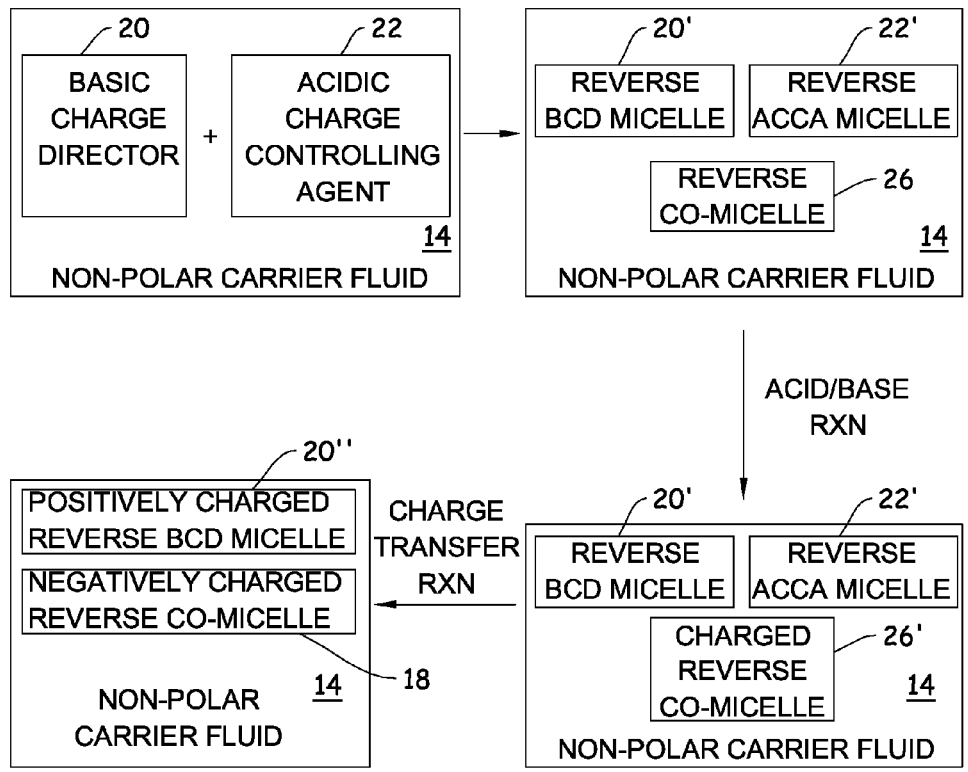
FIG. 2 depicts an example of a generic mechanism for forming an embodiment of the electronic ink.

FIG. 2 illustrates a general mechanism for forming the electronic ink 10 shown in FIG. 1. At the outset, a suitable carrier fluid 14 is selected. The non-polar carrier fluid 14 is any fluid having a low dielectric constant k such as, e.g., less than about 20, and, in some cases, less than about 2. Generally, the carrier fluid 14 acts as a vehicle for carrying the colorant particles 16 and co-micelles 18 therein. The carrier fluid is also an electrophoretic medium. Such fluids tend to reduce leakages of electric current when driving a display including the ink, as well as increase the electric field present in the fluid when a voltage is applied thereto. It is to be understood that when used in an electro-optical display, the carrier fluid 14 is the fluid or medium that fills up a viewing area defined in the display. In response to a sufficient electric potential or field applied to the colorant particles 16 while driving electrodes of the display, the colorant particles 16 tend to move and/or rotate to various spots within the viewing area in order to produce a desired visible effect in the display cell to display an image. The non-polar carrier fluid 14 suitable for the ink 10 disclosed herein includes, for example, one or more non-polar solvents selected from hydrocarbons, halogenated or partially halogenated hydrocarbons, oxygenated fluids, siloxanes, and/or silicones. Some specific examples of non-polar solvents include perchloroethylene, halocarbons, cyclohexane, dodecane, mineral oil, isoparaffinic fluids, cyclopentasiloxane, cyclohexasiloxane, and combinations thereof.

To ultimately generate the charged colorant particles 16 of the ink 10, a basic charge director 20 and an acidic charge controlling agent 22 are added to the non-polar carrier fluid 14. As previously mentioned, the basic charge director 20 and acidic charge controlling agent 22 selected have the same or similar molecular weights (i.e., the molecular weights are within 5000 of each other). This is believed to contribute at least to the formation of the charged colorant particles 16 and the resulting stability of the ink 10.

The charge director 20 may be selected from small molecules or polymers that are capable of forming reverse micelles in the non-polar carrier fluid 14. Such charge directors are generally colorless and tend to be dispersible or soluble in the carrier fluid 14. In the embodiments disclosed herein, the charge director 20 is also basic.

In a non-limiting example, the charge director 20 (also referred to as "BCD" in some of the Figures) is selected from a neutral and non-dissociable monomer or polymer such as, e.g., a polyisobutylene succinimide amine, which has the following molecular structure:

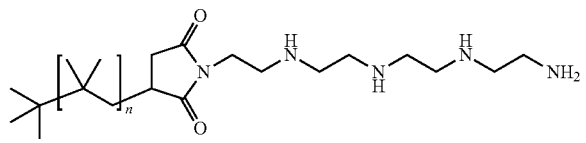

where n is selected from a whole number ranging from 15 to 100.

Another example of the charge director 20 includes an ionizable charge director that is capable of disassociating to form charges. Non-limiting examples of such charge directors include sodium di-2-ethylhexylsulfosuccinate and dioctyl sulfosuccinate. The molecular structure of dioctyl sulfosuccinate is as follows:

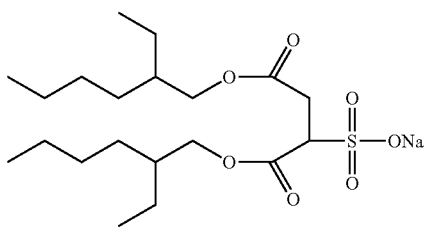

Yet another example of the charge director includes a zwitterion charge director such as, e.g., Lecithin. The molecular structure of Lecithin is as shown as follows:

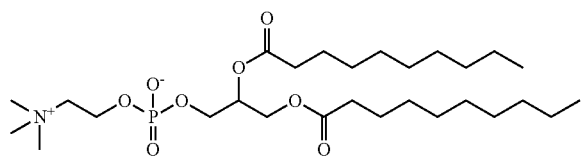 [SMILES: CCCCCCCCCC(=O)OCC(COP(=O)([O-])OCC[N+](C)(C)C)OC(=O)CCCCCCCCC]

As previously mentioned, the acidic charge controlling agent 22 (shown referred to as "ACCA" in some of the Figures) is added to the non-polar carrier fluid 14 with the basic charge director 20. The charge controlling agent 22 may be any molecule that is capable of interacting with the basic charge director 20 to form at least reverse co-micelles 26 in the non-polar carrier fluid.

In one embodiment, the molecular weights of suitable basic charge directors 20 and acidic charge controlling agents 22 range from about 1000 to about 15000. In one non-limiting example, the molecular weight of both the basic charge director 20 and the acidic charge controlling agent 22 is about 3000.

Specific examples of polymeric surfactants that may be used as the acidic charge controlling agent 22 include dispersants, such as hyper-dispersants from Lubrizol Corp., Wickliffe, Ohio (e.g., SOLSPERSE® 3000, 5000, 8000, 11000, 12000, 17000, 19000, 21000, 20000, 27000, 43000, etc.), or those commercially available from Petrolite Corp., St. Louis, Mo. (e.g., Ceramar™ 1608 and Ceramar™ X-6146, etc.). In one embodiment, the polymeric surfactant is poly(hydroxyl)aliphatic acid. One example of a suitable poly (hydroxyl)aliphatic acid includes:

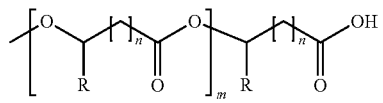

wherein m is an integer from 3 to 150, and n is an integer from 6 to 18.

A reaction scheme for forming poly(hydroxyl)aliphatic acid charge controlling agents 22 is shown in FIG. 3. In this particular example, carboxyalkyl aldehyde (where n ranges from 6 to 18) is reacted with Grignard reagents (alkyl magnesium halides, such as RMgI, where R is a methyl group, an ethyl group, or a hexyl group) to produce a hydroxycarboxylic acid (where n ranges from 6 to 18). The acid undergoes condensation and polymerization to produce a desirable polymeric surfactant (wherein n ranges from 6 to 18, and m is an integer ranging from 3 to 150) that can be used for the charge controlling agent 22.

Referring back to FIG. 2, the interaction of the basic charge director 20 and the acidic charge controlling agent 22 in the non-polar carrier fluid 14 generates reverse co-micelles 26, each of which includes the basic charge director 20 and the acidic charge controlling agent 22. As shown in example mechanism of FIG. 2, both single micelles of the basic charge director and of the acidic charge controlling agent can be formed (shown as 20' and 22', respectively).

It is believed to be an acid-base reaction that takes place within the reverse co-micelles 26, which gives rise to a charged reverse co-micelle 26'. This charged reverse co-micelle 26' is charged in that it includes both positive charge due to the basic charge director and negative charge due to the acidic charge controlling agent. The formation of the charged reverse co-micelle 26' in this manner (i.e., via an intra-micellular acid-base reaction) is more efficient than, for example, a disproportionation reaction.

Again, without being bound to any theory, it is believed that the charged reverse co-micelles 26' undergoes a charge transfer reaction with the basic charge director reverse micelles 20' present in the non-polar carrier fluid 14. As a result of this reaction, the basic charge director reverse micelles 20' acquire the positive charge from the charged reverse co-micelle 26'. This charge transfer results in positively charged basic charge director reverse micelles 20" and the negatively charged reverse co-micelles 18 in the non-polar carrier fluid 14. In this particular potential reaction mechanism, the positively charged basic charge director reverse micelles 20" then adsorb to a surface of the particles 24, resulting in the positively charged colorant particles 16 (shown in FIG. 1).

The reaction scheme shown in FIG. 2 is simply an example of the chemistry that may be taking place when the basic charge director 20 and the acidic charge controlling agent 22 having matching molecular weights are added to the non-polar carrier fluid 14. It is noted that the colorants 16 and other components (e.g., co-micelle 18 or other single micelles) disclosed herein may become charged via other mechanisms.

It is to be understood that the colorant particle cores 24 (see FIG. 1) may be added to the non-polar carrier fluid 14 at anytime throughout the process. In some instances, the acidic charge controlling agent 22 may be present on the surface of the colorant particle cores 24 or on the surface of a resin coated pigment particle, and thus the particles 24 are added with the acidic charge controlling agent 22. In other instances, the colorant particle cores 24 (i.e., the colorant particles prior to having the positively charged micelle adsorbed thereto) may be added before or after the reactions in and/or between the various micelles have taken place.

As used herein, the term "colorant particles" refers to particles that produce a desirable color. Some non-limiting examples of suitable colorant particles include pigment particles, a combination of pigment particles and a dye, nanoparticle pigment dispersions, polymer particles colored with dye molecules, or the like. In a non-limiting example, the colorant particles are selected from pigment particles that are self-dispersible in the non-polar carrier fluid. It is to be understood, however, that non-dispersible pigment particles may otherwise be used so long as the electronic ink includes one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK° 170, and DISPERBYK® 180); various dispersants manufactured by Evonik Goldschmidt GMBH LLC, Germany, (e.g., TECO® 630, TECO® 650, TECO® 651, TECO® 655, TECO® 685, and TECO® 1000); and various dispersants manufactured by Sigma-Aldrich, St. Louis, Mo., (e.g., SPAN® 20, SPAN® 60, SPAN® 80, and SPAN® 85).

The colorant particles 24 are selected from organic or inorganic pigments, and have an average particle size ranging from about 10 nm to about 10 μm. In some instances, the average particle size ranges from about 50 nm to about 1 μm.

Non-limiting examples of suitable red/magenta organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Still other red/magenta pigments that are suitable for the colorant particle cores 24 are selected from:

i) Naphthol red pigments 5

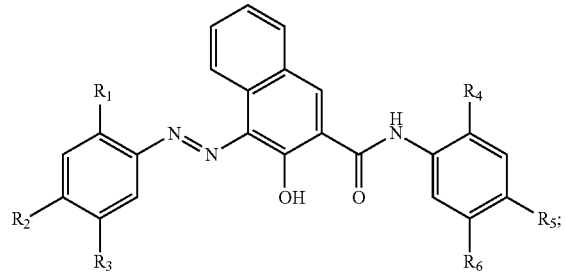

ii) β-Naphthol red pigment lakes 6

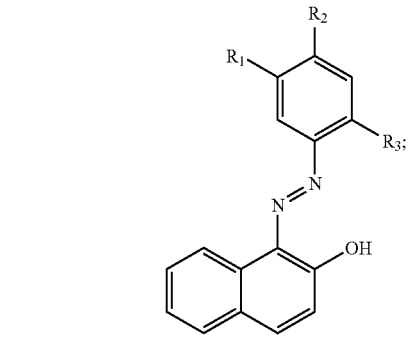

or iii) BONA pigment lakes 7

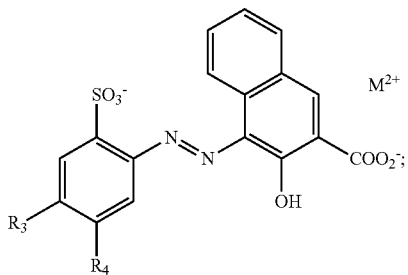

where $R_1$ through $R_6$ are each independently selected from a hydrogen atom, an alkyl group, a substituted alkyl group, an alkenyl group, a substituted alkenyl group, an aryl group, a substituted aryl group, an arylalkyl group (e.g., phenylmethyl, phenylethyl, phenylpropyl, etc.), a substituted arylalkyl group, a halogen atom, $-NO_2$, $-O-R_d$, $-CO-R_d$, $-CO-O-R_d$, $-O-CO-R_d$, $-CO-NR_dR_e$, $-NR_dR_e$, $-NR_d-CO-R_e$, $-NR_d-CO-O-R_e$, $-NR_d-CO-NR_eR_f$, $-SR_d$, $-SO-R_d$, $-SO_2-R_d$, $-SO_2-O-R_d$, $-SO_2NR_dR_e$ or a perfluoroalkyl group, wherein $R_d$, $R_e$ and $R_f$ are each independently selected from a hydrogen atom, an alkyl group, a substituted alkyl group, an alkenyl group, a substituted alkenyl group, an aryl group, and a substituted aryl group.

While magenta/red colorants are discussed further hereinbelow in the various Examples, it is to be understood that other colored colorants may be used in the inks 10 disclosed herein. Such other colorant particles include organic or inorganic pigment particles selected from black pigment particles, yellow pigment particles, cyan pigment particles, blue pigment particles, green pigment particles, orange pigment particles, brown pigment particles, and white pigment particles. In some instances, the organic or inorganic pigment particles may include spot-color pigment particles, which are formed from a combination of a predefined ratio of two or more primary color pigment particles.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Some non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Any of the colorant particles 24 described herein may have a polymer resin coating thereon or be embedded within a polymer resin. Non-limiting examples of such polymer resins include Gum rosin, polyacrylic acid resins, etc.

Referring again to FIG. 1, the electronic ink 10 includes the positively charged magenta pigment particles 16 and the reverse co-micelles 18. While not shown in FIG. 1, in some instances, the ink 10 may also include uncharged reverse micelles 20' and/or 22'. The size of the reverse co-micelles 18 is generally larger than the single component micelles 20', 22'. The positively charged magenta pigment particles 16 are generally larger than the reverse co-micelles 18.

Figure 4C:
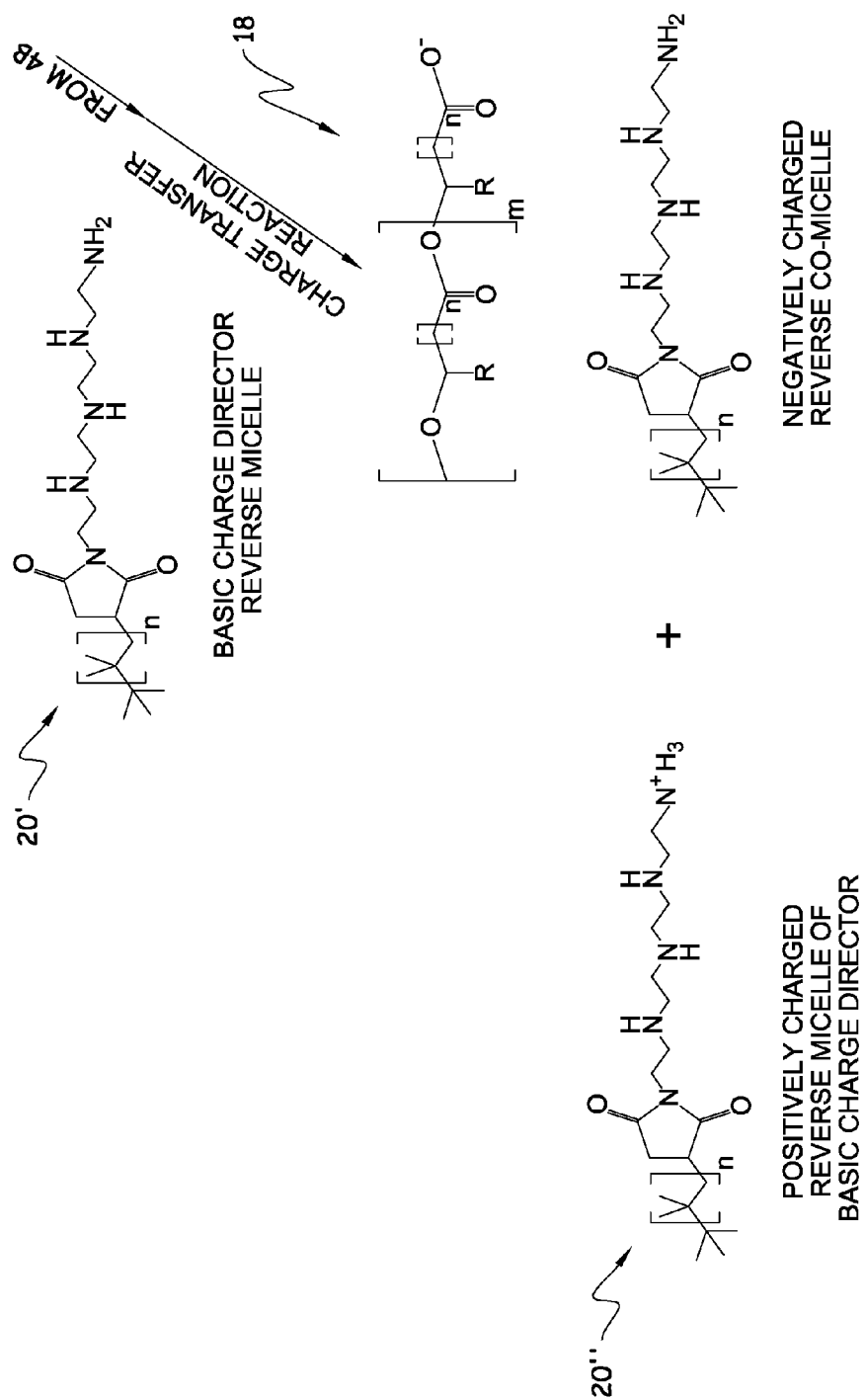

Referring now to FIGS. 4A through 4C, a non-limiting example of a possible reaction scheme to form positively charged basic charge director reverse micelles 20" and the negatively charged reverse co-micelles 18 in the non-polar carrier fluid 14 is depicted. In this example, polyisobutylenesuccinimide is the basic charge director 20 and a poly(hydroxyl)aliphatic acid is the acidic charge controlling agent 22.

The reaction scheme of FIGS. 4A through 4C begins when the reverse co-micelle 26 includes both the polyisobutylenesuccinimide and the poly(hydroxyl)aliphatic acid (see FIG. 4A). Within this co-micelle 26, it is believed that an acid-base reaction takes place. The polyisobutylenesuccinimide component of the co-micelle 26 is believed to be protonated with the proton from the acidic group of the poly(hydroxyl)aliphatic acid component of the co-micelle 26. This reaction is believed to result in the charged reverse co-micelle 26' (see FIG. 4B).

Without being bound to any theory, it is believed that in this mechanism, the charged reverse co-micelle 26' undergoes a charge transfer reaction with polyisobutylenesuccinimide reverse micelles 20' (which are believed to be present as a result of the initial interaction of the polyisobutylenesuccinimide charge director 20 and the non-polar carrier fluid 14). As shown in FIG. 4C, the polyisobutylenesuccinimide reverse micelle 20' is protonated with the hydrogen from the polyisobutylenesuccinimide component of the charged co-micelle 26'. As such, this reaction generates the positively charged polyisobutylenesuccinimide reverse micelles 20" and the negatively charged reverse co-micelles 18.

While not shown in FIGS. 4A through 4C, it is believed that the positively charged polyisobutylenesuccinimide reverse micelles 20" are capable of adsorbing to the surface of colorant particles 24 present in the non-polar carrier fluid 14, thereby forming the positively charged particle 16 in the ink 10.

The resulting ink 10 has improved stability, color density, switching speed, and zeta potential, when compared to other inks (including those formed via a disproportionation reaction).

It is to be understood that the electronic inks 10 disclosed herein may be used in a variety of applications, including electronic signage, electronic skins, wearable computer screens, electronic paper, and smart identity cards.

Figure 5A:
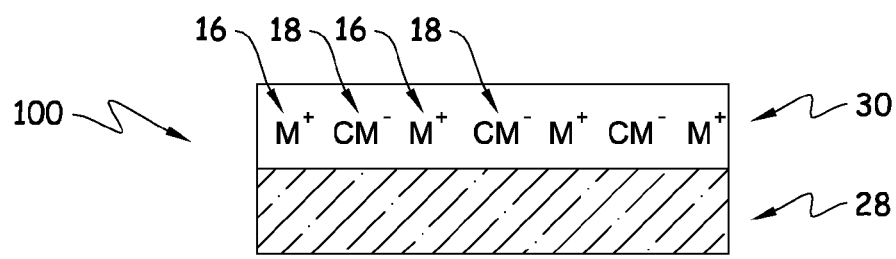
FIG. 5A is a cross-sectional schematic view of an embodiment of an electronic device incorporating an embodiment of the electronic ink disclosed herein.

A cross-sectional schematic view of embodiment of such a device 100 is shown in FIG. 5A. The electrically addressable ink 10 including both the positively charged particles 16 and the reverse co-micelles 18 may be incorporated onto a substrate 28 in the form of a layer 30. Non-limiting examples of suitable substrates 28 include plastic, glass, and/or metal foil that may be pre-patterned with electrodes, dielectric coatings, and/or reflective elements. The ink 10 may be established on the substrate 28 to form the layer 30 by any suitable technique, such as, for example, gravure coating, slot-die coating, dip-coating, doctor-blading, inkjetting, and/or the like, and/or combinations thereof.

It is to be understood that this electronic device 100 may be part of a display (the additional components of which are not shown). The electronic device 100 shown in FIG. 5A includes a single layer 30 which is made up of one embodiment of the electronic ink 10 disclosed herein. This particular non-limiting example includes positively charged magenta colorants $M^+$ and negatively charged reverse co-micelles $CM^-$. The magenta colorants $M^+$ and negatively charged reverse co-micelles $CM^-$ may be formed via the methods described in reference to FIGS. 1 and 4.

In response to a sufficient electric potential or field applied while driving the display in which the electronic device 100 is included, the colorants $M^+$ carried by the fluid tend to move and/or rotate to various spots within the viewing area in order to produce desired visible images. The applied field may be changed in order to change the visible images.

Figure 5B:
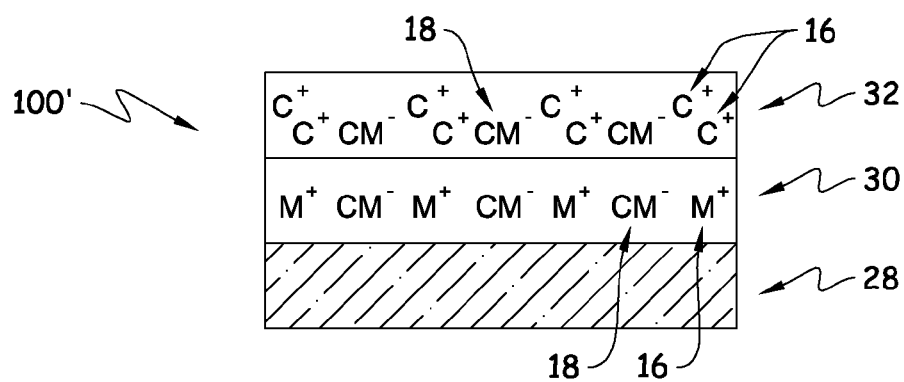
FIG. 5B is a cross-sectional schematic view of another embodiment of an electronic device incorporating embodiments of the electronic ink disclosed herein.

Another non-limiting example of an electronic device 100' is shown in FIG. 5B. It is to be understood that this electronic device 100' may also be incorporated into a display. The electronic device 100' shown in FIG. 5B includes two layers 30 and 32, one (i.e., 30) of which includes an embodiment of a magenta electronic ink, and the other of which (i.e., 32) includes an embodiment of a cyan electronic ink. This particular non-limiting example includes the first layer 30 with positively charged magenta colorants $M^+$ and negatively charged reverse co-micelles $CM^-$, and the second layer 32 with positively charged cyan colorants $C^+$ and reverse co-micelles $CM^-$.

It is to be understood that any of the electronic inks 10 disclosed herein may be used in device layers 30 and/or 32, and when multiple layers 30, 32 are used, each layer 30, 32 may include a different colored colorant (e.g., as shown in FIG. 5B). While not shown, it is to be further understood that the layer(s) 30, 32 disclosed herein may be used in combination with additional layers and/or a dual color layer.

The amounts of each of the components used to form the ink 10 may vary, depending at least in part, on the desirable amount to be made, the application in which it will be used, etc. To further illustrate embodiment(s) of the present disclosure, the following examples are given herein. It is to be understood that these examples (and the amounts used therein) are provided for illustrative purposes and are not to be construed as limiting the scope of the disclosed embodiment(s).

EXAMPLES

Comparative Example 1

About 60 mg of basic polyisobutylenesuccinimide was introduced into 6.0 g of halogenated solvent to form a solution. About 60 mg of quinacridone pigment was added to the solution, and the product yielded a magenta electronic ink having a particle size of about 320 nm and a zeta potential of about −3 mV.

Comparative Example 2

About 60 mg of basic polyisobutylenesuccinimide was introduced into 6.0 g of hydrocarbon solvent to form a solution. About 60 mg of quinacridone pigment was added to the solution, and the product yielded a magenta electronic ink having a particle size of about 152 nm and a zeta potential of about −3 mV.

Example 3

About 60 mg of basic polyisobutylenesuccinimide and 60 mg of polyhydroxystearic acid was introduced into 6.0 g of halogenated solvent to form a solution. About 60 mg of Pigment Rubine was added to the solution, and the product yielded a magenta electronic ink having a particle size of about 370 nm and a zeta potential of about +50 mV.

Example 4

About 120 mg of basic polyisobutylenesuccinimide and 120 mg of polyhydroxystearic acid introduced into 6.0 g of halogenated solvent to form a solution. About 60 mg of Pigment Rubine was added to the solution, and the product yielded a magenta electronic ink having a particle size of about 370 nm and a zeta potential of about +50 mV.

Example 5

About 90 mg of basic polyisobutylenesuccinimide and 90 mg of polyhydroxystearic acid was introduced into 6.0 g of an isoparaffinic fluid to form a solution. About 90 mg of Pigment Rubine was added to the solution, and the product yielded a magenta electronic ink having a particle size of about 310 nm and a zeta potential of about +50 mV.

Examples 3 and 4 illustrate that the inks disclosed herein may be made with different amounts of the components. These results illustrate that in one embodiment, the same amount of charge director and charge controlling agent may be used. It is believed that other amounts may also be suitable for forming the inks disclosed herein (see, e.g., Example 6, which has double the amount of acidic charge controlling agent).

Example 6

About 180 mg of basic polyisobutylenesuccinimide and 90 mg of acidic polymeric hyperdispersant (molecular weight of around 3000) was introduced into 6.0 g of an isoparaffinic fluid to form a solution. About 90 mg of Pigment Rubine was added to the solution, and the product yielded a magenta electronic ink having a particle size of about 189 nm and a zeta potential of about +40 mV.

Comparative Example 7

About 180 mg of basic polyisobutylenesuccinimide and 90 mg of acidic polymeric hyperdispersant (molecular weight of around 12000) was introduced into 6.0 g of an isoparaffinic fluid to form a solution. About 90 mg of Pigment Rubine was added to the solution, and the product yielded a magenta electronic ink having a particle size of about 216 nm and a zeta potential of about +0.05 mV.

Example 8

About 180 mg of basic polyisobutylenesuccinimide and 90 mg of acidic polymeric hyperdispersant is introduced into 6.0 g of hydrocarbon solvent to form a solution. About 90 mg of cyan pigment is added to the solution, and the product yields a cyan electronic ink.

Example 9

About 180 mg of basic polyisobutylenesuccinimide and 90 mg of acidic polymeric hyperdispersant is introduced into 6.0 g of hydrocarbon solvent to form a solution. About 90 mg of yellow pigment is added to the solution, and the product yields a yellow electronic ink.

Example 10

About 180 mg of basic polyisobutylenesuccinimide and 90 mg of acidic polymeric hyperdispersant is introduced into 6.0 g of hydrocarbon solvent to form a solution. About 90 mg of black pigment is added to the solution, and the product yields a black electronic ink.

While several embodiments have been described in detail, it will be apparent to those skilled in the art that the disclosed embodiments may be modified. Therefore, the foregoing description is to be considered exemplary rather than limiting.

What is claimed is:

1. An electronic ink, comprising:
   a non-polar carrier fluid;
   a plurality of positively charged colorant particles dispersed in the non-polar carrier fluid; and
   a plurality of negatively charged reverse co-micelles, each of which includes, as respective components, a basic charge director and an acidic charge controlling agent, wherein the basic charge director has a molecular weight that is within 5000 of a molecular weight of the acidic charge controlling agent.

2. The electronic ink as defined in claim 1, further comprising a plurality of single reverse micelles in the non-polar carrier fluid, wherein the single reverse micelles are selected from reverse micelles of the basic charge director and reverse micelles of the acidic charge controlling agent.

3. The electronic ink as defined in claim 1 wherein the basic charge director has a molecular weight that is within 1000 of a molecular weight of the acidic charge controlling agent.

4. The electronic ink as defined in claim 1 wherein the positively charged colorant particles include a magenta particle selected from:

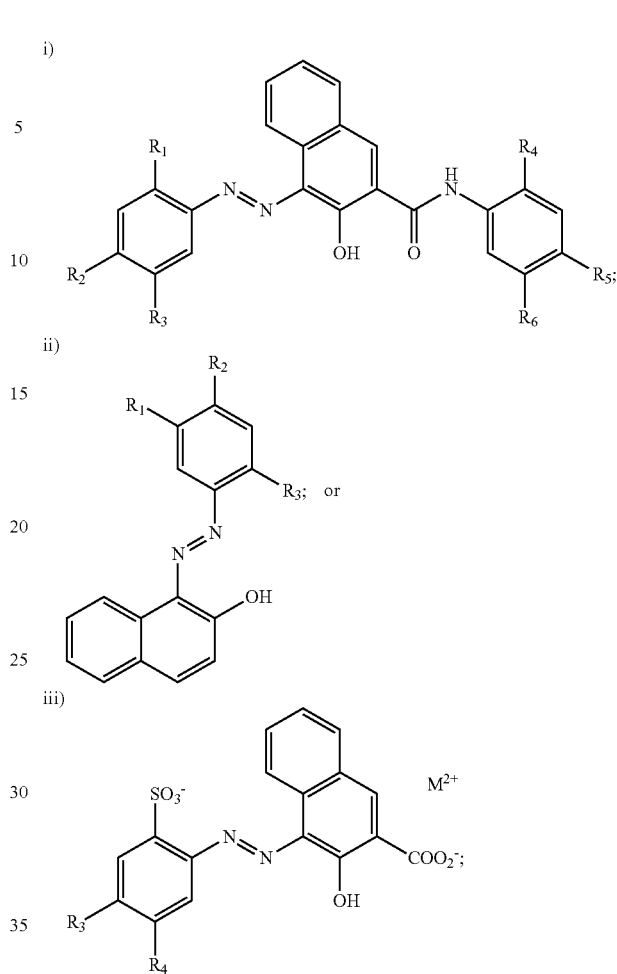

wherein R1 through R6 are each independently selected from a hydrogen atom, an alkyl group, a substituted alkyl group, an alkenyl group, a substituted alkenyl group, an aryl group, a substituted aryl group, an arylalkyl group, a substituted arylalkyl group, a halogen atom, —NO2, —O—Rd, —CO—Rd, —CO—O—Rd, —O—CO—Rd, —CO—NRdRe, —NRdRe, —NRd—CO—Re, —NRd—CO—O—Re, —NRd—CO—NR-eRf, —SRd, —SO—Rd, —SO2—Rd, —SO2—O—Rd, —SO2NRdRe or a perfluoroalkyl group, wherein Rd, Re and Rf are each independently selected from a hydrogen atom, an alkyl group, a substituted alkyl group, an alkenyl group, a substituted alkenyl group, an aryl group, and a substituted aryl group.

5. The electronic ink as defined in claim 1 wherein a zeta potential of the electronic ink ranges from +20 mV to +150 mV.

6. The electronic ink as defined in claim 1 wherein the acidic charge controlling agent is a poly(hydroxyl)aliphatic acid, and wherein the basic charge director is selected from i) polyisobutylene succinimide amine, ii) chargeable, dissociable, and ionizable molecules selected from the group consisting of sodium di-2-ethylhexylsulfosuccinate and dioctyl sulfosuccinate, and iii) Lecithin.

7. The electronic ink as defined in claim 1 wherein the non-polar carrier fluid is a non-polar solvent selected from perchloroethylene, halocarbons, cyclohexane, dodecane, mineral oil, isoparaffinnic fluids, siloxanes, and combinations thereof.

8. The electronic ink as defined in claim 1 wherein a surface of the positively charged colorant particles is coated with a polymer resin.

9. The electronic ink as defined in claim 1 wherein the positively charged colorant particles are selected from yellow pigment particles, green pigment particles, brown pigment particles, cyan pigment particles, blue pigment particles, magenta pigment particles, red pigment particles, orange pigment particles, white pigment particles, spot-color pigment particles, and black pigment particles.

10. The electronic ink as defined in claim 1 wherein each of the plurality of positively charged colorant particles includes:
a colorant particle core; and
positively charged basic charge director reverse micelles adsorbed to a surface of the colorant particle core.

11. An electronic ink, comprising:
a non-polar carrier fluid;
a plurality of positively charged colorant particles dispersed in the non-polar carrier fluid; and
a plurality of reverse co-micelles including a basic charge director and an acidic charge controlling agent, wherein the basic charge director has a molecular weight that is within 5000 of a molecular weight of the acidic charge controlling agent;
wherein the acidic charge controlling agent is:

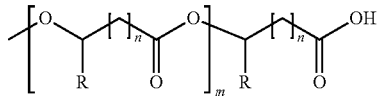

wherein m= an integer from 3 to 150 and n= an integer from 6 to 18; and wherein the basic charge director is:

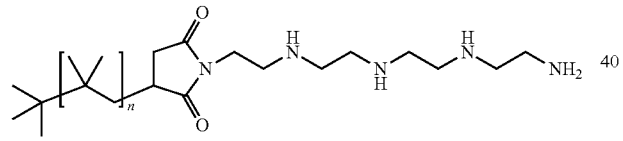

wherein n is selected from a whole number ranging from 15 to 100.

12. A method for making an electronic ink, comprising:
adding a plurality of colorant particles to a non-polar carrier fluid; and
incorporating a basic charge director and an acidic charge controlling agent as respective components into the non-polar carrier fluid, the basic charge director having a molecular weight that is within 5000 of a molecular weight of the acidic charge controlling agent, thereby forming a plurality of positively charged colorant particles and a plurality of negatively charged reverse co-micelles dispersed in the non-polar carrier fluid, each reverse co-micelle including the basic charge director and the acidic charge controlling agent as respective components.

13. The method as defined in claim 12 wherein an amount of the basic charge director incorporated into the non-polar carrier fluid ranges from i) being equal to an amount of the acidic charge controlling agent incorporated into the non-polar carrier fluid to ii) being double an amount of the acidic charge controlling agent incorporated into the non-polar carrier fluid.

14. An electronic device, comprising:
a substrate; and
at least one layer of an electronic ink established on the substrate, the electronic ink including:
a non-polar carrier fluid;
a plurality of positively charged colorant particles dispersed in the non-polar carrier fluid; and
a plurality of negatively charged reverse co-micelles, each of which includes, as respective components, a basic charge director and an acidic charge controlling agent, wherein the basic charge director has a molecular weight that is within 5000 of a molecular weight of the acidic charge controlling agent.

15. The electronic device as defined in claim 14 wherein the plurality of positively charged colorant particles exhibit a first color and wherein the electronic device further comprises at least one other layer of an electronic ink established on the at least one layer, the at least one other layer at least including a plurality of charged colorant particles exhibiting a second color different from the first color.

16. The electronic device as defined in claim 14 wherein the positively charged colorant particles include a magenta particle selected from:

i)

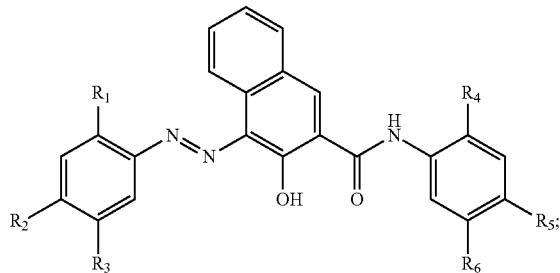

ii)

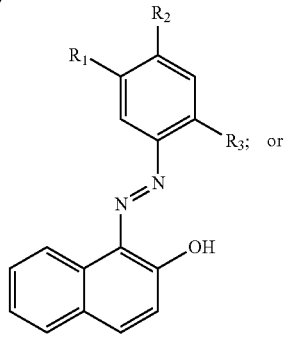

iii)

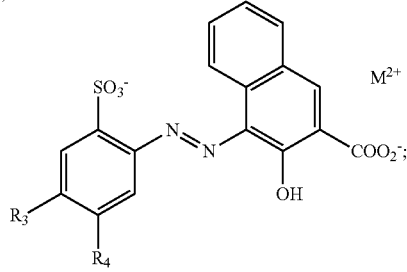

wherein R1 through R6 are each independently selected from a hydrogen atom, an alkyl group, a substituted alkyl group, an alkenyl group, a substituted alkenyl group, an aryl group, a substituted aryl group, an arylalkyl group, a substituted arylalkyl group, a halogen atom, —NO2, —O—Rd, —CO—Rd, —CO—O—Rd, —O—CO—Rd, —CO—NRdRe, —NRdRe, —NRd—CO—Re, —NRd—CO—O—Re, —NRd—CO—NReRf, —SRd, —SO—Rd, —SO2—Rd, —SO2—O—Rd, —SO2NRdRe or a perfluoroalkyl group, wherein Rd, Re and Rf are each independently selected from a hydrogen atom, an alkyl group, a substituted alkyl group, an alkenyl group, a substituted alkenyl group, an aryl group, and a substituted aryl group.

17. The electronic device as defined in claim 14, wherein the electronic ink further comprises a plurality of single reverse micelles in the non-polar carrier fluid, wherein the single reverse micelles are selected from reverse micelles of the basic charge director and reverse micelles of the acidic charge controlling agent.

18. The electronic device as defined in claim 14 wherein the basic charge director has a molecular weight that is within 1000 of a molecular weight of the acidic charge controlling agent.

19. The electronic device as defined in claim 14 wherein the acidic charge controlling agent is a polymeric surfactant, and wherein the basic charge director is selected from i) neutral, non-dissociable, and chargeable molecules, ii) chargeable, dissociable, and ionizable molecules, and iii) zwitterions.

20. The electronic device, comprising:
a substrate; and
at least one layer of an electronic ink established on the substrate, the electronic ink including:
a non-polar carrier fluid
a plurality of positively charged colorant particles dispersed in the non-polar carrier fluid; and
a plurality of reverse co-micelles including a basic charge director and an acidic charge controlling agent, wherein the basic charge director has a molecular weight that is within 5000 of a molecular weight of the acidic charge controlling agent;
wherein the acidic charge controlling agent is:

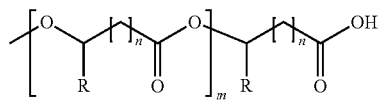

wherein m= an integer from 10 to 150 and n= an integer from 6 to 12; and wherein the basic charge director is:

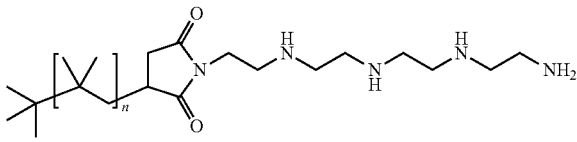

wherein n is selected from a whole number ranging from 15 to 100.

* * * * *